United States Patent
King et al.

(10) Patent No.: US 7,014,780 B2
(45) Date of Patent: Mar. 21, 2006

(54) STAND ALONE WATER PURIFIER SYSTEM

(75) Inventors: Joseph A. King, Wayzata, MN (US); Jeffrey D. Johnson, Hopkins, MN (US)

(73) Assignee: King Technology, Hopkins, MN (US)

( * ) Notice: Subject to any disclaimer, the term of this patent is extended or adjusted under 35 U.S.C. 154(b) by 0 days.

(21) Appl. No.: 10/682,596

(22) Filed: Oct. 9, 2003

(65) Prior Publication Data

US 2004/0069698 A1 Apr. 15, 2004

Related U.S. Application Data

(60) Division of application No. 09/945,207, filed on Aug. 31, 2001, now Pat. No. 6,685,827, which is a continuation-in-part of application No. 09/628,637, filed on Jul. 31, 2000, now Pat. No. 6,500,334.

(51) Int. Cl.
*C02F 1/00* (2006.01)

(52) U.S. Cl. .................. 210/749; 210/169; 210/205

(58) Field of Classification Search ............... 210/749, 210/169, 198.1, 205

See application file for complete search history.

(56) References Cited

U.S. PATENT DOCUMENTS

| | | | | | |
|---|---|---|---|---|---|
| 4,801,376 | A | * | 1/1989 | Kulitz | 210/123 |
| 6,017,400 | A | * | 1/2000 | Clark et al. | 134/21 |
| 6,162,407 | A | * | 12/2000 | Pihl | 422/266 |
| 6,221,244 | B1 | * | 4/2001 | Yassin | 210/169 |
| 6,224,779 | B1 | * | 5/2001 | Spector | 210/754 |
| 6,254,894 | B1 | * | 7/2001 | Denkewicz et al. | 424/618 |
| 6,544,415 | B1 | * | 4/2003 | King | 210/205 |
| 6,592,766 | B1 | * | 7/2003 | King | 210/749 |

* cited by examiner

*Primary Examiner*—Betsey Morrison Hoey
(74) *Attorney, Agent, or Firm*—Jacobson & Johnson

(57) ABSTRACT

A water treatment device, method and system with the water treatment device having a container for holding a water treatment material therein with the water treatment device including a shroud extending in a direction generally normal to a flow of debris laden water with the shroud inhibiting direct flow of debris into a water inlet in the water treatment device by directing water and debris over the shroud and around the water treatment device while a portion of the water can be directed laterally into the water treatment material within the water treatment device to thereby purify the water that flows over the water treatment materials with the water treatment device including multiple spaced and positioned water inlets so that the likelihood of the water inlet being completely obstructed is remote.

19 Claims, 14 Drawing Sheets

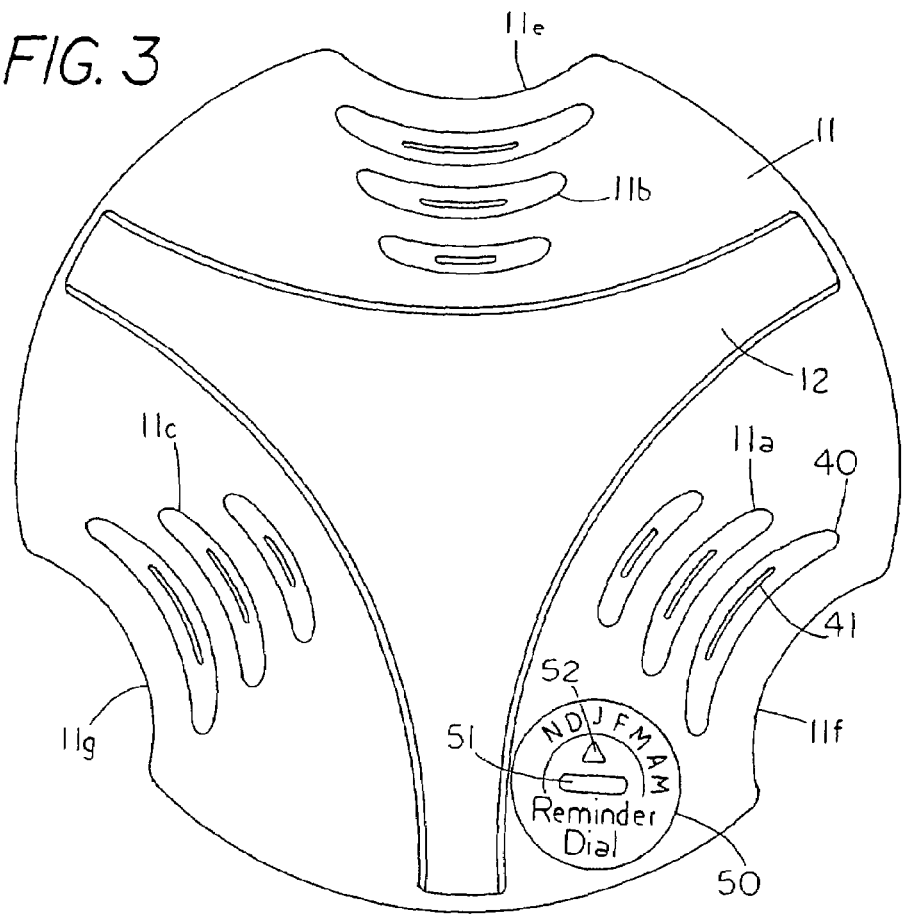
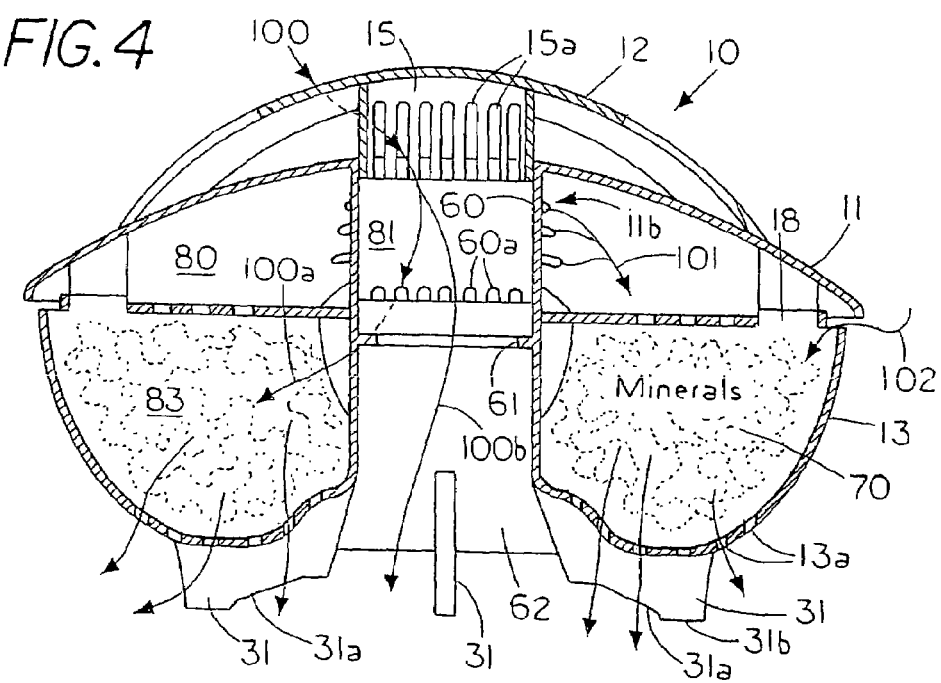

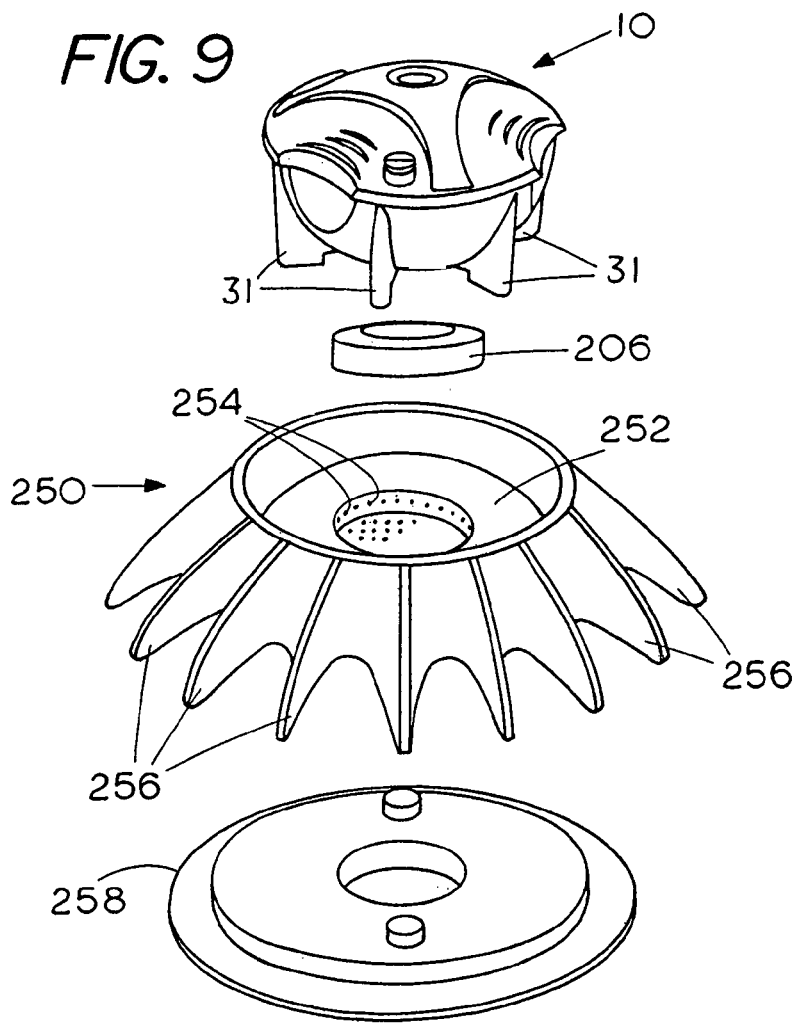
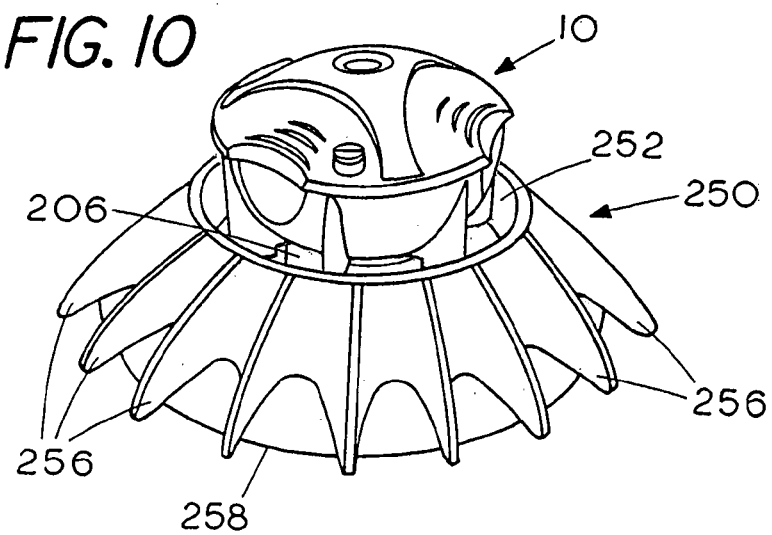

STAND ALONE WATER PURIFIER SYSTEM

CROSS-REFERENCE TO RELATED APPLICATIONS, IF ANY

This application is a division, of application Ser. No. 09/945,207, filed Aug. 31, 2001 now U.S. Pat. No. 6,685,827.

This application is a continuation-in-part of U.S. patent application Ser. No. 09/628,637, filed Jul. 31, 2000 now U.S. Pat. No. 6,500,334.

STATEMENT REGARDING FEDERALLY SPONSORED RESEARCH OR DEVELOPMENT

Not applicable.

REFERENCE TO A MICROFICHE APPENDIX, IF ANY

Not applicable.

FIELD OF THE INVENTION

This invention relates generally to water treatment systems and, more specifically, to a water treatment system and method for treating water in a stream of water that may contain debris.

BACKGROUND OF THE INVENTION

One of the difficulties with treatment of water in the skimmer basket region of a pool or spa is that the water treatment device becomes clogged with debris. One prior art approach is shown in U.S. Pat. No. 5,124,032 where the canister that holds chlorine is maintained above or along side the skimmer basket. Another approach is shown in U.S. Pat. Nos. 5,779,913 and 6,019,893, which show a dispenser that is secured to the underside of a skimmer basket. While not holding water purification materials, U.S. Pat. No. 5,830,350 discloses a pool skimmer basket that includes a central member that projects above the top of the skimmer basket in order to prevent the basket from becoming clogged and thus preventing flow there through. Thus, the placement of water purification devices in a skimmer basket is generally avoided because of clogging problems.

The present invention provides a water treatment system wherein a water treatment device can be effectively positioned in a number of different locations in the flow of water with debris, with the water treatment device maintaining the water inlet to the water treatment device in a condition, wherein water can continue to be directed through the water treatment system even though there is a continual presence of debris in the water flowing around the water purification device.

BRIEF DESCRIPTION OF THE PRIOR ART

U.S. Pat. No. 5,830,350 discloses a pool skimmer basket with a central core projecting above the top of the skimmer basket.

U.S. Pat. No. 5,124,032 discloses a swimming pool chlorinator that is maintained above the bottom of the skimmer basket.

U.S. Pat. Nos. 6,019,893 and 5,779,913 disclose a water purification device that is secured to the underside of the skimmer basket.

SUMMARY OF THE INVENTION

A water treatment method and system with the water treatment system including a water purification device comprising a container for holding a water treatment material therein with the water purification device including a shroud extending in a direction generally normal and lateral to a flow of debris laden water, with the shroud inhibiting direct flow of debris into a water inlet in the water purification device by directing water and debris over the shroud and around the water purification device, while a portion of the water is directed laterally into and through the water purification device and a further portion is directed through water purification material within the water purification device to thereby purify the water that flows over the water purification materials. A shielded exit located below the water purification devices maintains a portion of the skimmer basket free of debris to thereby provide a path for water to continually flow through the water purification device. The water purification device can also include multiple spaced and laterally positioned water inlets so that the likelihood of the water inlet being completely obstructed by debris is remote. The invention also includes a number of water purification systems that incorporate the described water purification device to purify a contained volume of water.

BRIEF DESCRIPTION OF THE DRAWINGS

FIG. 3 is a top view of the water purification device shown in FIG. 1;

FIG. 4 of the water purification device of FIG. 1;

FIG. 9 shows an exploded view of one embodiment of a water purification system for placement adjacent a main drain intake of a pool;

FIG. 10 shows the water purification system of FIG. 9 in operational use;

DESCRIPTION OF THE PREFERRED EMBODIMENT

Figure 1:
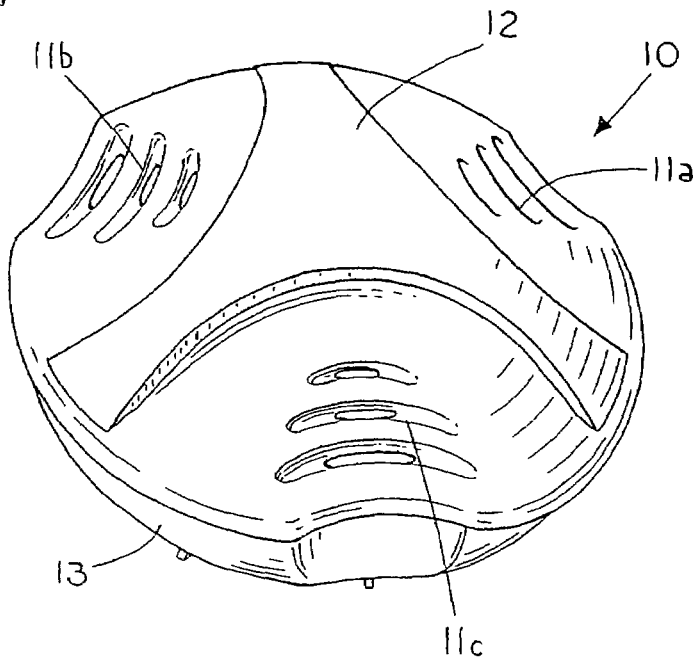
FIG. 1 is a perspective view of the water purification device of the present invention.

FIG. 1 is a perspective view of the water treatment device 10 usable in the water treatment system with the water purification device having a general spherical shape with a cover 12 that is also suitable for use as a handle for removing and replacing the water purification device when the water treatment material therein is spent or the skimmer basket is removed for cleaning. That is, cover 12 is spaced sufficiently far from shroud 11 so that a user can insert his or her fingers beneath the cover to lift the water purification device free of the skimmer basket.

A shroud 11 extends radially outward to extend circumferentially over a container 13 located thereunder. Shroud 11 includes a first set of shroud water inlets 11a, a second set of shroud water inlets 11b and a third set of shroud water inlets 11c for directing water into container 13. Each of the individual water shroud inlets has an arcuate shape and each of the water inlets includes at least three water inlet ports with the apex of each of the arcuate shroud water inlets located at the highest vertical position of the shroud inlet. The shroud inlets together with the shroud, as will be described herein, provide for flushing debris away from the shroud inlets.

Figure 2:
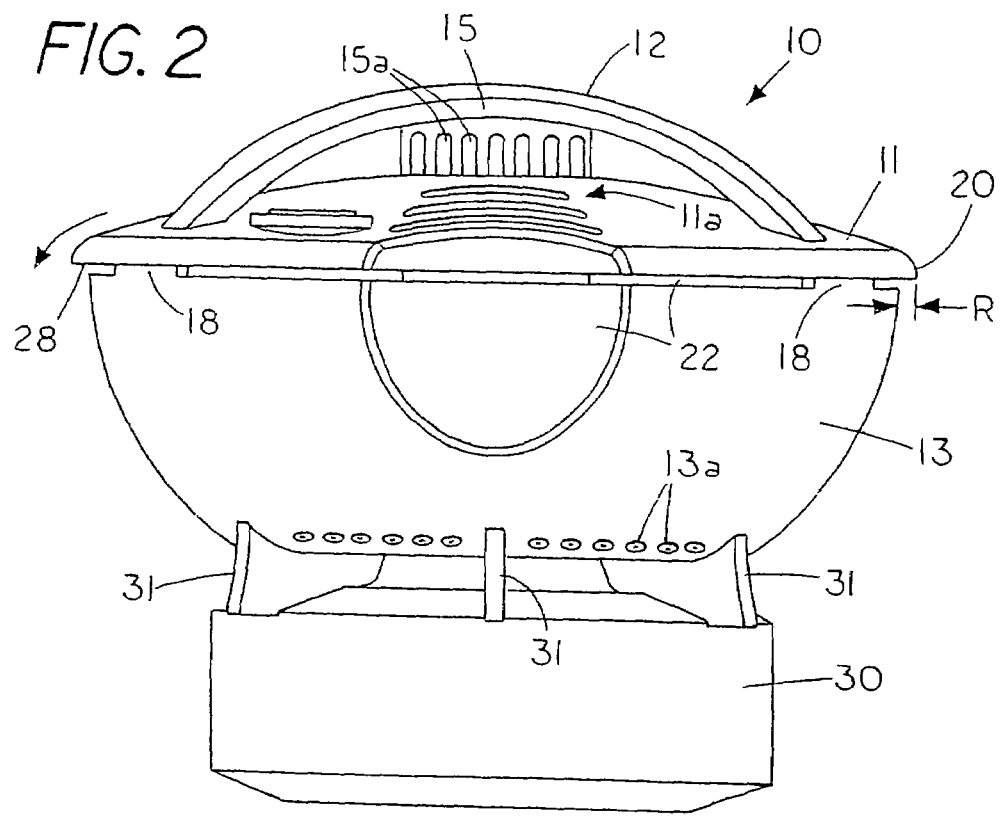
FIG. 2 is a front view of the water purification device shown in FIG. 1 with the water purification device positioned on a puck.

FIG. 2 is a front view of the water purification device 10, with the water purification device positioned on a puck 30 comprising a bacteria killing chemical such as bromine or chlorine.

In the operative position, the water purification device can handle two different and distinct water treatment products while maintaining the flow of water into contact with both materials to thereby ensure that the water can be rid of unwanted bacteria or algae.

The water purification device 10 is shown with shroud 11 extending radially outward over container 13 a distance denoted by R. Shroud 11 forms a lateral top shield for a circumferential water inlet 22 formed between container 13 and cover 11. That is, a set of tabs 18 connect and hold shroud 11 in a spaced condition from container 13 so that water can flow laterally in the circumferential inlet 22 located around the periphery of the water purification device 10. The purpose of having shroud 11 extend beyond the periphery of container 13 is to enable the shroud to carry water and debris that impinges normally on the water purification device to be carried past the lateral shielded water inlets 22. The arrow indicates the direction of water flow as the water flows over the circumferential edge 20 of the shroud 11. However, since the water itself will tend to be drawn backward to the underside 28 of shroud 11 by the Coanda effect, water will be directed laterally inward into container 13 though inlet 22. Consequently, for debris to enter circumferential inlet 22 would require that the debris make an abrupt change in direction to flow into the circumferential inlet. Consequently, the momentum of the debris causes it to separate from the flow of water and be carried past the circumferential inlet 22. Thus, the circumferential water inlets 22 provide one path for ingress of water into water purification device 10 while inhibiting debris from entering therein.

Located on the top portion of water purification device 10 is a cylindrical extension 15 that extends vertically upward from shroud 11 to the underside of cover 12. FIG. 3 illustrates that cover 11 shields the cylindrical extension 15. Located within cylindrical extension 15 is a set of circumferentially spaced elongated slots 15a that communicate with an interior chamber of water purification device 10. Elongated slots 15a provide a primary water inlet of water into the water purification device 10 while the cover 12 shields the water inlets from clogging with debris by extending laterally past the elongated openings to thereby inhibit debris from entering water inlets 15a.

The positioning of water inlet 15a at the top of the water purification device provides a two-fold purpose. First, it allows water to flow into the water purification device and passage 60 even if the debris in the skimmer begins to build to a height sufficient to cover the skimmer basket. That is, if the debris builds up around the periphery of the water purification device 10, it creates a greater resistance for water flow around the water purification device 10. Consequently, if any water can still flow through the skimmer basket loaded with debris, the water will continue to flow in the path of least resistance that is through the center of the water purification device and through passage 60. Thus, the system operates to purify water even if the skimmer basket becomes filled with materials. Of course it is good practice not to allow the skimmer basket to be become completely filled, as one should periodically empty the skimmer basket. Second, it allows water to flow into the water purification materials in the water purification device even though the skimmer basket may be filling up with debris.

In the embodiment shown, a set of legs 31 support the water purification device 10 on top of puck 30 with a water discharge outlet formed in the space between the underside of water purification device 10 and puck 30. If puck 30 rests on the bottom of the skimmer basket, the water flowing through the water purification device 10 will be able to be released into the water, since the radially extending shroud and container 13 shields the water outlet from the container from debris.

A further feature of the water purification device is that the water purification device 10 maintains a debris free footprint on the bottom of the skimmer basket. That is, container 13, which is supported on legs 31, occupies a circular space over the bottom of the skimmer basket to prevent debris from failing into a circular area on the bottom of the skimmer basket and thereby completely clogging the bottom of the skimmer basket with debris.

FIG. 3 is a top view of the water purification device 10 showing cover 12 with portions of cover 12 extending radially outward in three different directions. The cover 12 completely shields the water inlet 15a (FIG. 2) from the normal flow direction. It is noted that the set of shroud water inlets 11a, 11b and 11c are not shielded by cover 12 but are spaced radially outward on shroud 11 with each of the water inlets having a curved recess that surrounds the port therein. For purposes of description only one of the shroud ports and inlets will be described; however, the others have similar shapes. Reference numeral 40 identifies an arcuate shaped recess 40 with an arcuate shaped port 41 positioned centrally therein at the bottom of the arcuate shaped recess 40. The purpose of having the port 40 located below the plane of the shroud is so that any debris that might block the opening 41 would not be able to come into direct contact with port 41, thereby allowing a continuing flow of water to channel or wash any debris off the smooth dome shape of shroud 11.

While flow is directed over the surface of the dome shaped shroud 11, there is included a set of scallops for funneling the water around the water purification device. As each of the scallops is identical, only one will be described herein. A scallop 11f is located in water purification device 10 to provide a larger area for water to flow past the shroud. As a result, water tends to funnel laterally into the scallop 11f and over the recessed areas of the shroud inlets thereby producing a washing action over the set of shroud water inlets 11a to thereby inhibit debris in the water from blocking or obstructing the shroud water inlets 11a, 11b and 11c. It is apparent that in the present invention each of the water inlets includes either an obstruction or a flow diverter to inhibit debris from blocking the water inlets.

Located on the top side of water purification device 11 is a reminder dial that contains an outer section listing symbols that correspond to the month of the year and an interior rotatable dial 51 that can be rotated so that pointer 52 points to the month that the water purification device 10 should be replaced.

FIG. 4 shows a cross sectional view of the water purification device 10 with flow arrows indicating the multiple separate flows of water through the water purification device 10. Located within the interior of the water purification device 10 is a water passage 60 that extends centrally through the water purification device 10, with the elongated slots 15a being in fluid communication with water passage 60. Extending circumferentially around passage 60 are a set of circumferential water inlets 60a that direct water radially outward from passage 60 into an annular chamber 80, wherein water flows through water purification materials 70 located in an annular compartment 83 within container 13. In the present embodiment the water purification materials 70 includes a silver ion generating material. In addition, zinc or other metals can be used and, if desired, limestone can be used to maintain the pH of the water. The present invention is well suited for the mineral type dispensers as the minerals can be shielded and protected from debris contamination.

Passage 60 includes a restriction 61 that comprises a radial restriction in flow area through passage 60. The purpose of restriction 61 is to increase the resistance to water flow through passage 81, thus creating a back pressure in region 81 in fluid passage 60 which causes water to flow laterally and radially outward through water inlet 60a and into the water purification material 70. The amount of restriction can be adjusted to maintain the proper flow through the water purification device by increasing or decreasing the diameter of the opening therein. It will be evident that the water flowing though inlet 15a has two routes, a first route straight through the water purification device 10 without contacting the minerals 70 and a second route through the water purification minerals 70.

To illustrate the multiple flow paths of water through the water purification device 10, reference should be made to FIG. 4, which shows a water flow arrow 100. Water flows through primary water inlet 15a and into central chamber 81 in water passage 60. A portion of the water flow is delivered into minerals 70, as indicated by arrow 100a, and a further portion, indicated by arrow 100b, flows directly through passage 80 without coming into contact with the water purification materials 70. Thus, a portion of the primary flow of water that enters the top of the water purification device flows directly through the water purification device without contacting the water purification materials, while a further portion is brought into contact with the water purification materials 70.

Referring again to FIG. 4, a second flow path of water into chamber 80 through inlets 11b is indicated by arrow 101. This portion of water flows downward into minerals 70 without any of the water stream being directed away from the water purification material.

FIG. 4 shows a third source of water flowing into the container 13 through the circumferential passage 22 which extends between container 13 and shroud 11. Arrow 102 indicates the direction of flow of water through passage 22 directly into the minerals 70. In each case the water flows through the minerals 70 and is discharged from the container 13 through water outlets 13a located at the lower portion of container 13a, as indicated by the arrows extending through outlets 13a. Thus, in operation of the invention, water can be directed through any of the three sets of water inlets with two of the water inlets including either a cover to prevent direct flow of water into the water inlets and the third water inlet having a recess with an arcuate shape that allows water to be funneled toward the inlet and thereby wash off any debris that may have a tendency to block the entry. From the above description it is apparent that in operation, two of the three water inlets direct all the water into the minerals 70, while the third inlet directs only a portion of the water into the water purification materials.

While only one set of water inlets could be used to direct water through the water purification device, the use of multiple water inlets, each of which have some type of mechanism for maintaining the water inlet in a debris free condition, greatly enhances the chances of at least some of the water inlets being maintained in an open condition so that water can be continually purified as water flows through the water purification device 10.

Thus, the water purification device continues to provide enhanced water purification characteristics even though some of the water inlets may become blocked with debris.

Figure 5:
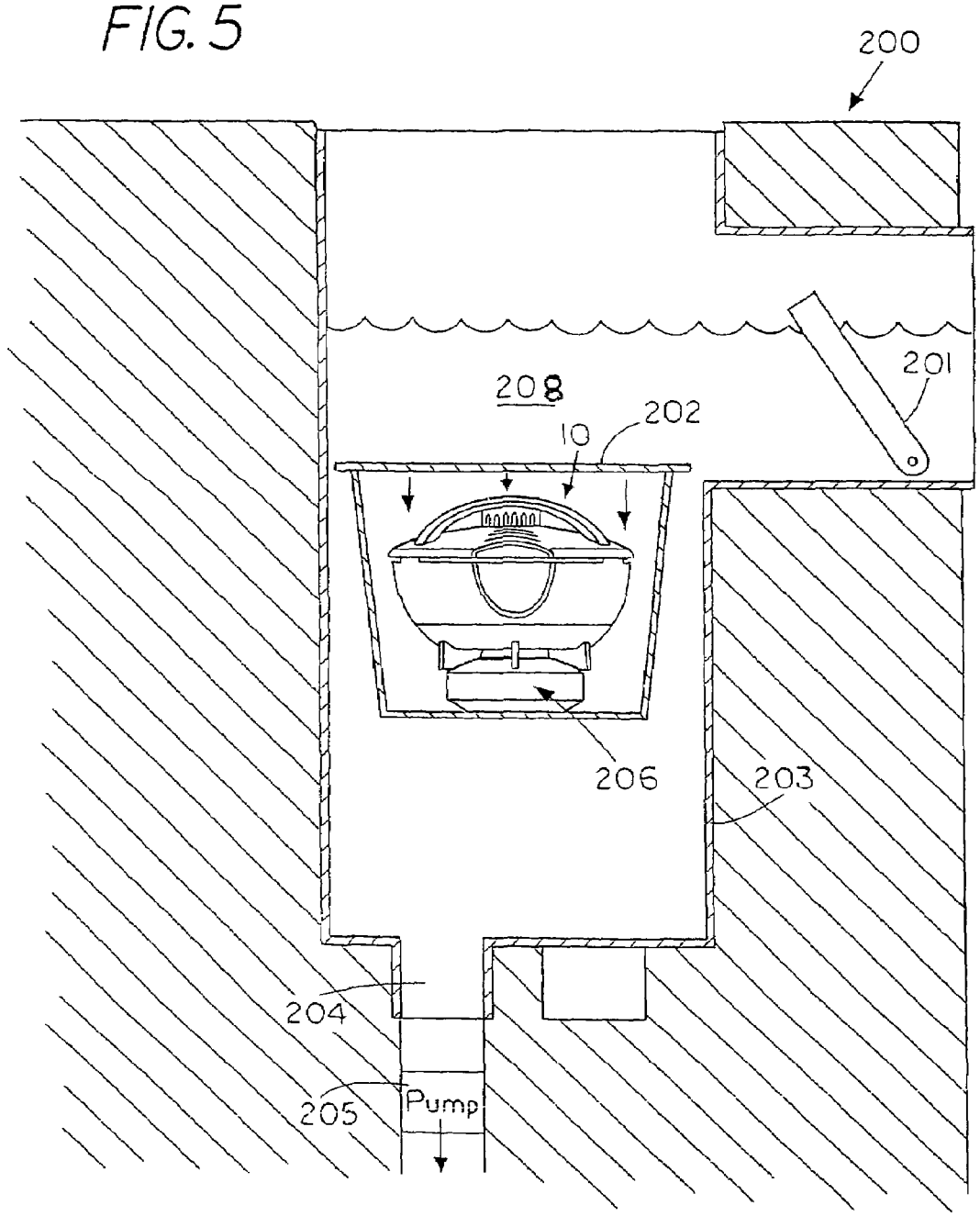
FIG. 5 shows the water purification device located in a skimmer basket in a swimming pool with a bacteria-killing puck supporting the water purification device.

FIG. 5 shows the water purification device 10 located in a skimmer basket 202 in a swimming pool 200 with a bacteria killing puck 206 supporting the water purification device. A pivoting gate 201 permits enter of water 208 into skimmer basket 202. A pump 205 pulls water from the bottom outlet 204. In this condition the water impinges normally downward on the water purification device 10 as indicated by the arrows, with the water dividing and flowing as described in relation to FIG. 4. In this condition, the water purification device 10 can both purify water with minerals as well as dispense chlorine, since the water purification device directs a stream of water over the chlorine source to provide a controlled release of chlorine.

Figure 6:
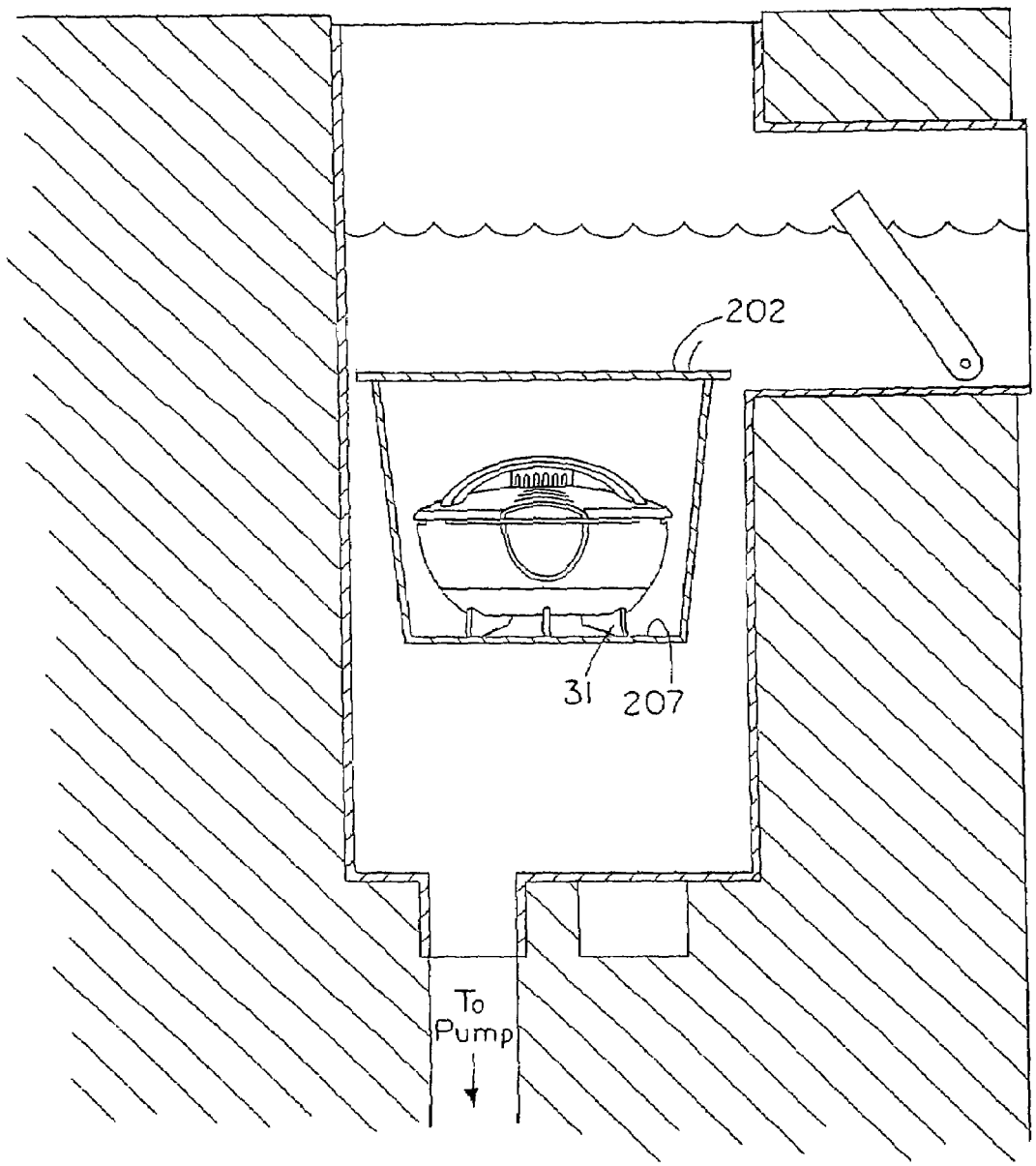
FIG. 6 shows the water purification device positioned in the bottom of a skimmer basket with the top of the water purification device located below the top of the skimmer basket.

FIG. 6 shows the water purification device positioned in an alternate operating condition with the water purification device 10 supported in the bottom 207 of a skimmer basket by legs 31. The top of the water purification device 10 is located below the top of the skimmer basket and the legs 31 support the water purification device 10 above the bottom 207 of skimmer basket to allow flow of water from the water purification device 10 through skimmer basket 202. FIG. 6 is identical to FIG. 5 except that the chemical puck 206 shown in FIG. 5, which is preferably chlorine, has not been included in the system. The advantage of placing puck 206 directly below the water purification devices, as shown in FIG. 5, is that it provides a controlled release of chlorine. In addition, debris is prevented from piling on top of the puck 206 by the water purification device 10 that forms an umbrella or shield over the puck. Also, because the internal water passage 60 is large in comparison to the flow paths through the water purification materials, one is ensured that a large portion of the fluid stream flows onto the chemical puck 206, thereby liberating the bacteria killing chemical. A further advantage is that a substantially more constant rate of water is directed onto the puck 206 than if the puck were maintained in a free condition in the skimmer basket.

Figure 7:
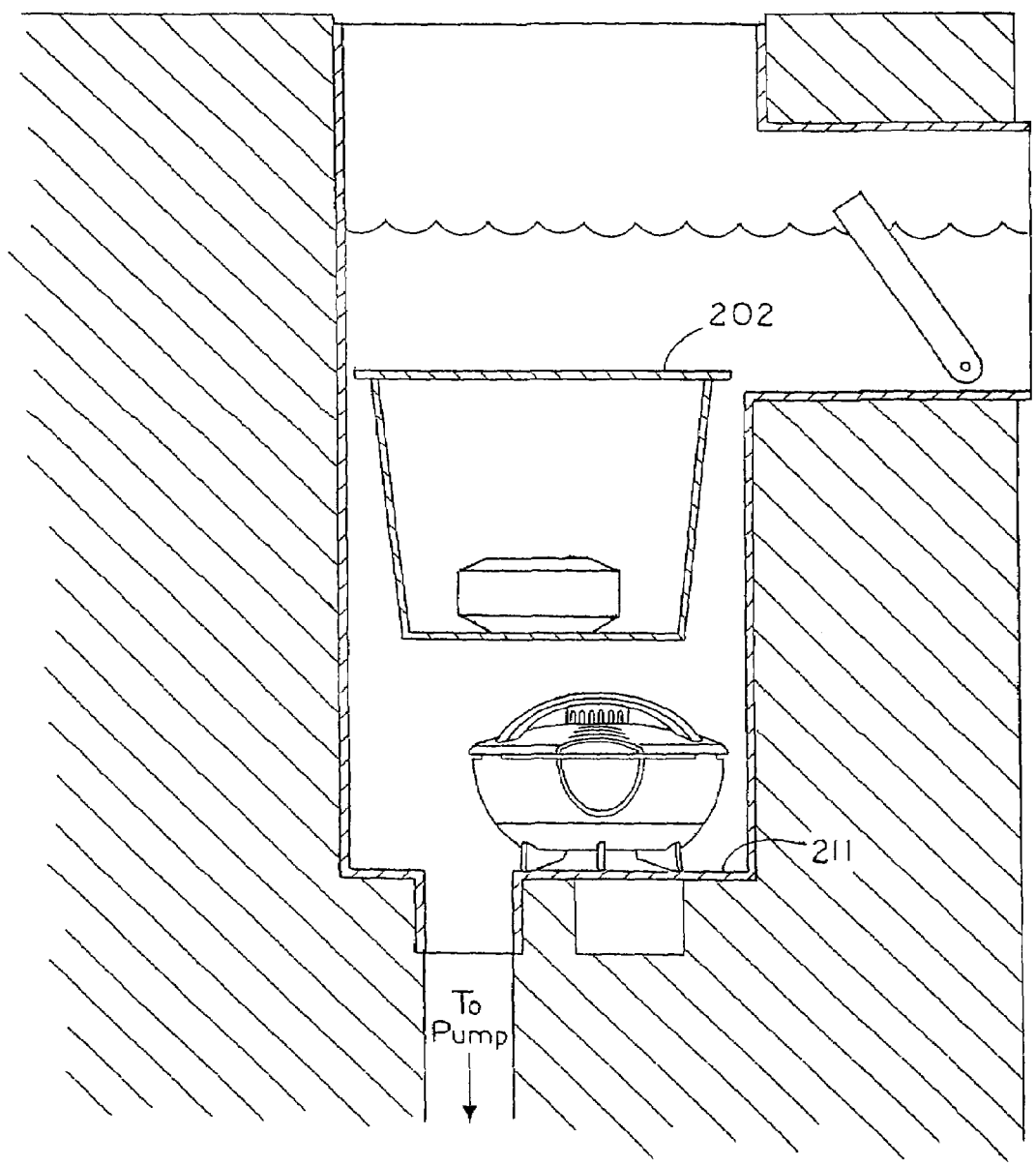
FIG. 7 shows the water purification device located below the skimmer basket in a pool of water with a bacteria killing puck located in the skimmer basket.

While it is preferable to maintain the chemical puck beneath the water purification device in certain applications, it may not be necessary to shield the chemical puck 206. FIG. 7 shows the water purification device 10 can be located below the skimmer basket 202 in a pool of water 208 with a bacteria killing puck 206 located in the skimmer basket and the water purification device 10 located in housing 211 that contains the skimmer basket 202. The system of FIG. 7 allows the maintaining of the bacterial killing chemical puck 206 separate from the water purification device and for maintaining the water purification device 10 in a position where the water is generally cleaner, since debris would be collected by the skimmer basket 202. Consequently, the present invention, while providing for operation in severe conditions, also permits the user to employ the water purification device 10 in various operating positions while still maintaining an effective delivery system.

The present invention provides a method of purifying water in a fluid stream containing debris by placing a container 13 with a water purification material 70 therein, with the container 13 having a shroud 11 thereover so that the shroud is aligned in a direction at least partially normal to a flow of a stream of water so that at least a portion of the stream of water and debris therein impinges on the shield and is then carried past container 13, and at least a portion of the water stream is separated therefrom so as to flow laterally into the container 13, with the lateral flow of the portion of water inhibiting debris in the water from being carried into the water inlets and thereby inhibiting the obstruction of the water inlets.

The container 13 can be placed either in the skimmer basket or downstream of the skimmer basket. In addition, a bacterial killing chemical can be placed beneath the container so that water flowing through a passage in the container impinges on the bacteria killing chemical to kill bacteria In order to maintain proper flow through the container, one can place a restriction in the passage in the container so as to increase the pressure of fluid in a passage in the container to thereby direct more or less water in a second lateral direction into the container 13.

By forming the shroud 11 of larger diameter than the container 13, the shroud extends radially over the container 13 to thereby cause a further portion of water with debris therein to flow over the shroud 11 and past the container 13, while a portion of the water can flow laterally into the container 13 and through the water purification materials 70.

In summary, the present invention provides for effective dispersion of water purification minerals under a variety of adverse conditions, as well as providing the user an option to use the water purification device to shield solid chemicals that can be dispensed into the water to help maintain the purity of the water.

The water purification device 10, which is suitable for use inside or outside of a skimmer basket, is shown in Figures to include a water purification mineral 70 located in the annular container 13 for holding the water purification minerals 17, with the container 13 having an outlet for passage of water therethrough. The outlet passage comprises a set of openings 13a sufficiently small to maintain the minerals 70 in the container from being washed out. A shroud 11 extends over container 13 to deflect debris carried by the water away from the Container 13. A first lateral water inlet 15a, comprised of vertical elongated openings directs a portion of water flowing thereto into the water purification mineral container 13 and a further portion through the container 13 without contacting the water purification mineral 70. The cover 11, which extends over first water inlet 15a, inhibits debris from blocking the first water inlet 15a. The second lateral water inlets which is comprised of circumferential lateral inlet 22, directs a different portion of water beneath the shroud 11 and into the water purification mineral 70 in the container, and a third lateral water inlet comprised of shroud water inlets 11a, 11b and 11c, which are recessed in the shroud, direct a still different portion of water into the water purification minerals 70 so that water flowing through the water purification device 10 enters in discreet portions at multiple different locations in the water purification device 10, with each of the three multiple different locations at different vertical elevations on the water purification device 10.

In further embodiments of the present invention, various water purification systems or water treatment systems for a contained water volume, such as present in a swimming pool, spa hot tub or the like are disclosed. These systems utilize the adaptability of the present invention to function in a wide range of environments from a no flow environment to flow environment conditions and from debris free water to water containing debris.

Figure 8:
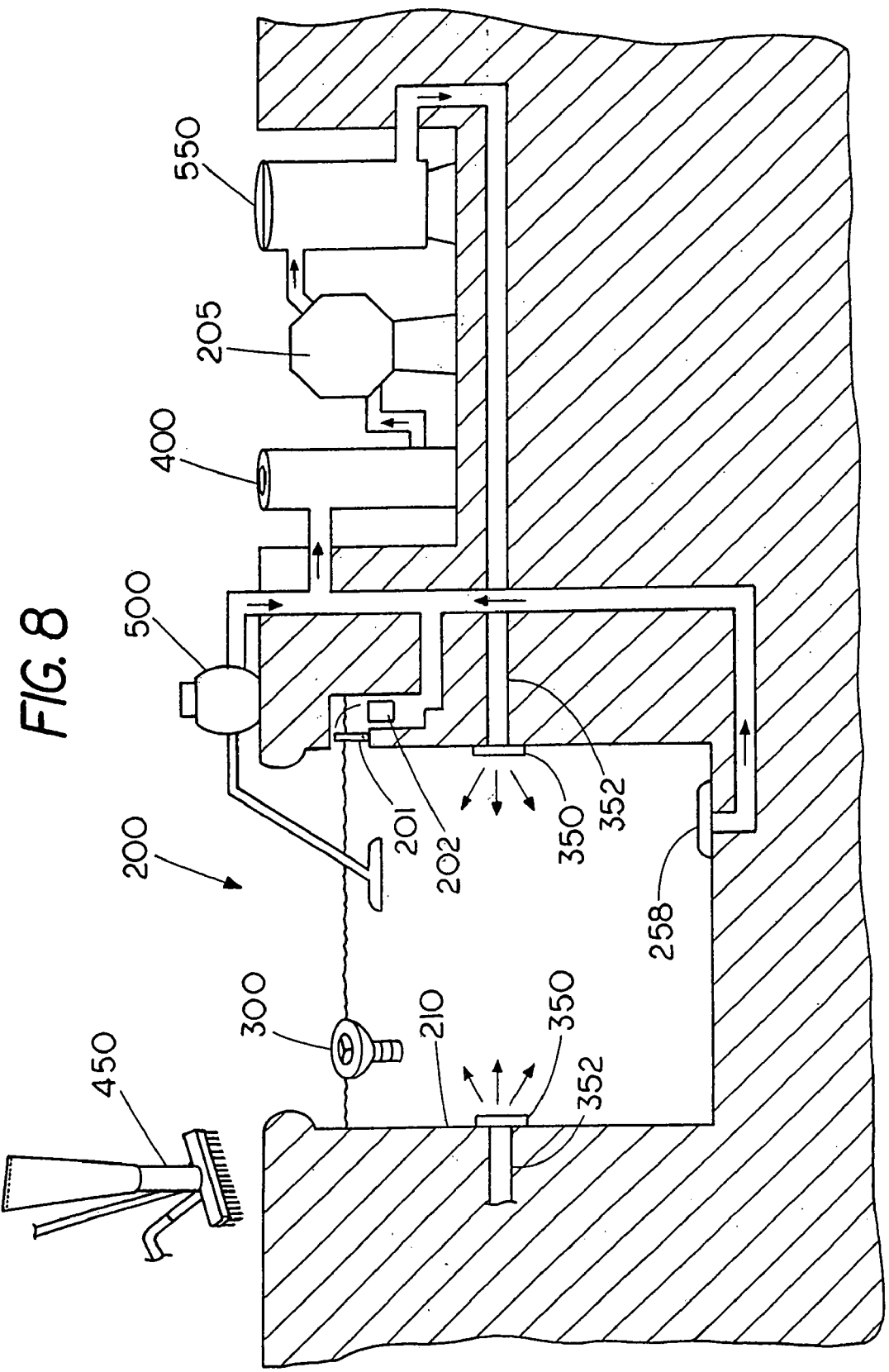
FIG. 8 shows a cross-sectional view of a swimming pool fitted with various embodiments of a water purification system.

Referring to FIG. 8, a number of water treatment systems are depicted in relationship to a swimming pool 200. The treatment system that includes a skimmer basket 202 has been described above. Another treatment system includes the main drain intake 258 of the pool, while yet another treatment system includes the water return conduit 350 and inlet fitting 352. A treatment system that includes a floatation support member 300 is also described. Another treatment system includes a debris prefilter 400 for a pump 205, while yet another treatment system includes a fluid powered debris collection member 450. Also disclosed is a treatment system that includes a leaf trap member 500 connected to the pumping system for the pool 200, as well as a treatment system that includes a cartridge filter assembly 550.

Referring to FIGS. 9 and 10, one embodiment of the water treatment system of the present invention is shown. The system includes the water treatment device 10 described above that has a set of legs 31 for support, The device 10 is positioned on a supporting base member 250 immediately above the main drain intake 258 of a swimming pool 200. The base member 250 includes a circular concave top portion 252, with multiple apertures 254 therein, on which the device 10 rests. A number of support legs 256 are radially disposed around the circular concave top portion 255 to elevate the top portion 255 above the drain intake 258. As water is drawn into the drain intake 258, a portion contacts and flows though the water treatment device 10 as described above, thereby contacting the water treatment material 83 contained therein. The water treatment material 83 preferably includes a metal ion yielding material, and most preferably includes silver chloride. The water continues though the apertures 254 in the support concave top portion 252 and is drawn into the drain intake 258. The support concave top portion 252 is sized to accept a chemical puck 206 positioned beneath the legs 31 of the water treatment device 10. The puck 206 introduces chlorine or bromine to the water flowing into the apertures 254 and on to the main drain intake 258.

Figure 11:
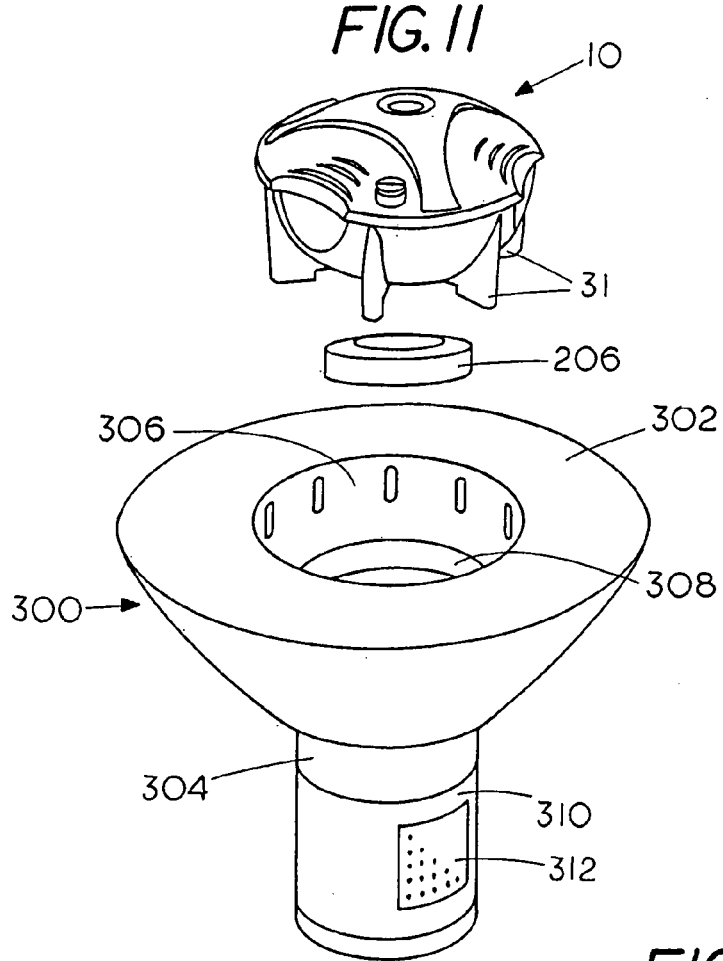
FIG. 11 shows an exploded view of another embodiment of a water purification system for placement in the contained water volume of a pool.
Figure 12:
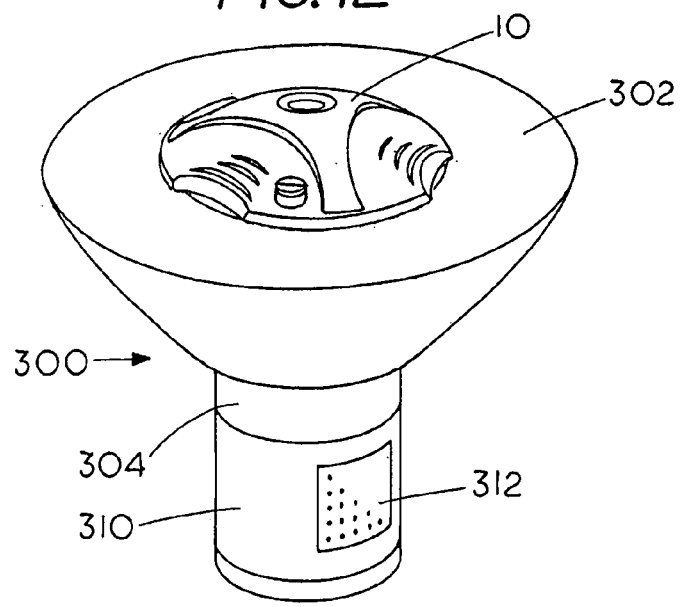
FIG. 12 shows the water purification system of FIG. 11 in operational use.

Another embodiment of the water treatment system of the present invention is shown in FIGS. 11 and 12. The system includes the water treatment device 10 described above that has a set of legs 31 for support. The device 10 is positioned in a floatation support member 300 that floats the treatment system on the pool water surface. The floatation support member 300 includes a hollow floatation top portion 302 and a weighted hollow bottom portion 304 for holding other water treatment materials and for controllably dispensing the other water treatment material therefrom. A converging central passage 306 from the floatation top portion 302 terminates at the hollow bottom portion 304, with the bottom opening controlled by a rotatable sleeve portion 310 with a perforated section 312. The converging central passage 306 is sized to accept the water treatment device 10 with the legs 31 resting on a ledge 308 in the passage 306. With the device 10 positioned in the converging central passage 306 of the floatation support member 300, pool water passes around and though the device 10 as described above, thereby contacting the water treatment material 83 contained therein. The water treatment material 83 preferably includes a metal ion yielding material, and most preferably includes silver chloride. The water flows through the converging central passage 306 and out the perforated section 312 of the rotatable sleeve portion 310. The converging central passage 306 is sized to accept a chemical puck 206 positioned beneath the legs 31 of the device 10 and supported on the ledge 308 of the passage 306. The puck 206 introduces chlorine or bromine to water flowing through the passage 306 of the floatation support member 300.

Figure 13:
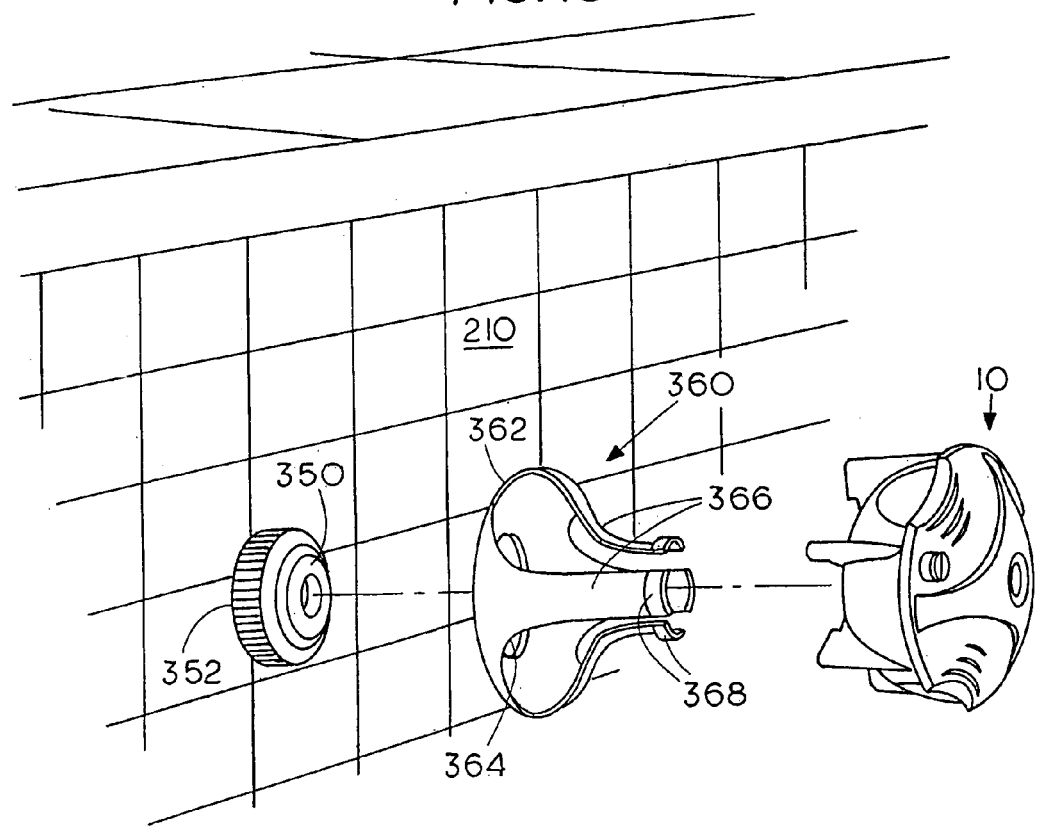
FIG. 13 shows an exploded view of another embodiment of a water purification system for securing to a water return inlet fitting of a pool.
Figure 14:
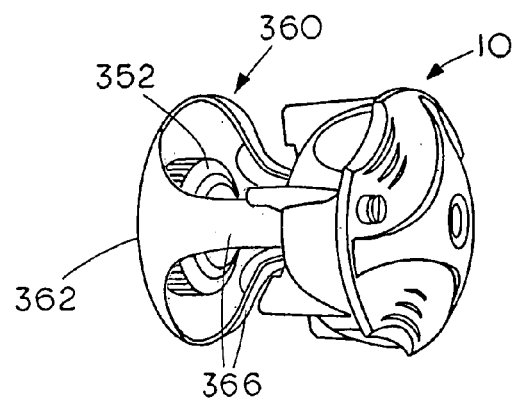
FIG. 14 shows the water purification system of FIG. 13 in operational use.

Referring to FIGS. 13 and 14, another embodiment of the water treatment system of the present invention is shown. The system includes a water return conduit 350 held in position on a pool wall 210 by a water return inlet fitting 352. The conduit 350 returns water to the pool 200 from various debris removal/filtration units with the pump 205 providing movement of water through the units and through the conduit 350. A hollow mushroom-shaped mounting flange member 360, having a top portion 362 with an aperture 364 therein, is secured to the return conduit 350 by removing the inlet fitting 352 from the conduit 350, positioning the aperture 364 of the mounting flange member 360 over the conduit 350 and reattaching the inlet fitting 352 to the conduit 350. The mounting flange member 360 includes a set of resilient mounting leg members 366 extending opposite the top portion 362. Each leg member 366 has a ridge portion 368 at the end thereof. The leg members 366 are designed to secure the water treatment device 10 to the mounting flange member 360 by inserting the leg members 366 into the central passage 60 of the device 10, where the leg ridge portions 368 engage the radial restriction 61 of the passage 60, to secure the device 10 to the mounting flange member 360. The central passage 60 and the radial restriction 61 of the device 10 are best seen in FIG. 4.

Pool water from the water return conduit 350 is directed toward the central passage 60 of the water treatment device 10, and through the device 10, thereby contacting the water treatment material 83 contained therein. The water treatment material 83 preferably includes a metal ion yielding material, and most preferably includes silver chloride. The water treatment device 10 is easily replaced with a fresh device 10 when the water treatment material 83 of one device 10 is spent.

Figure 15:
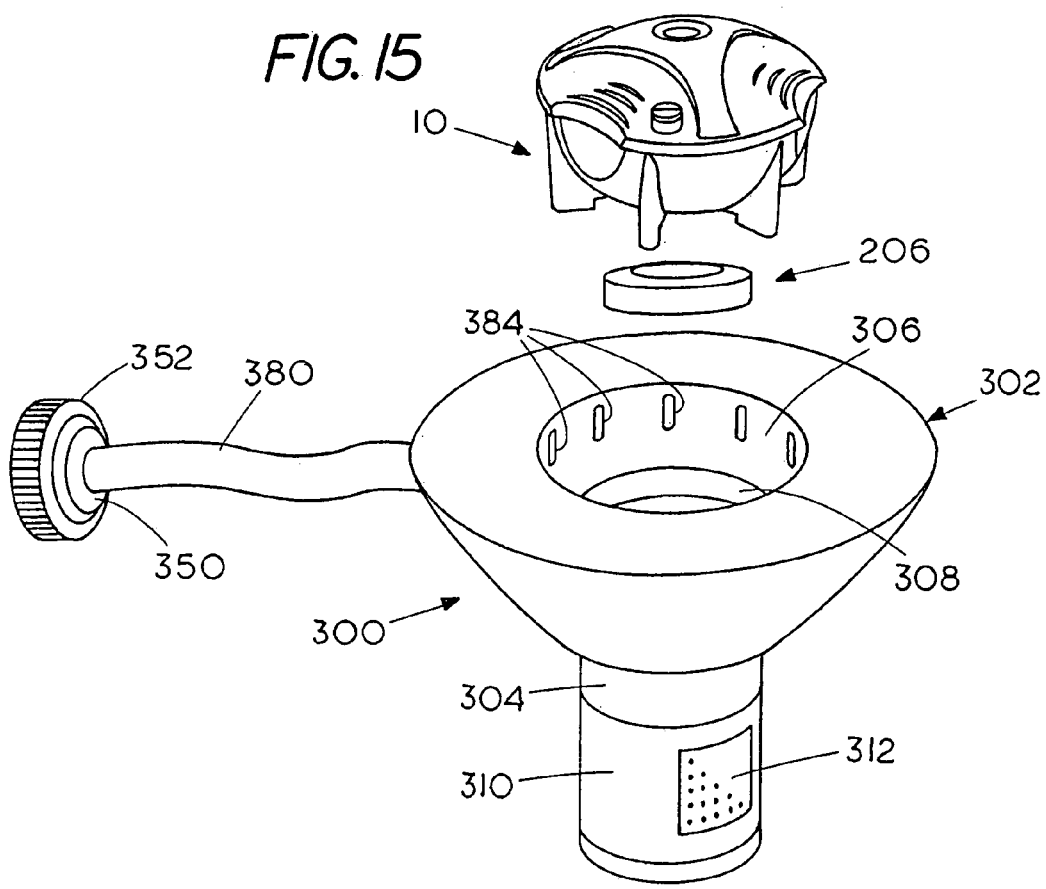
FIG. 15 shows an exploded view of another embodiment of a water purification system for securing to a water return inlet fitting and placement in the contained water volume of a pool.
Figure 16:
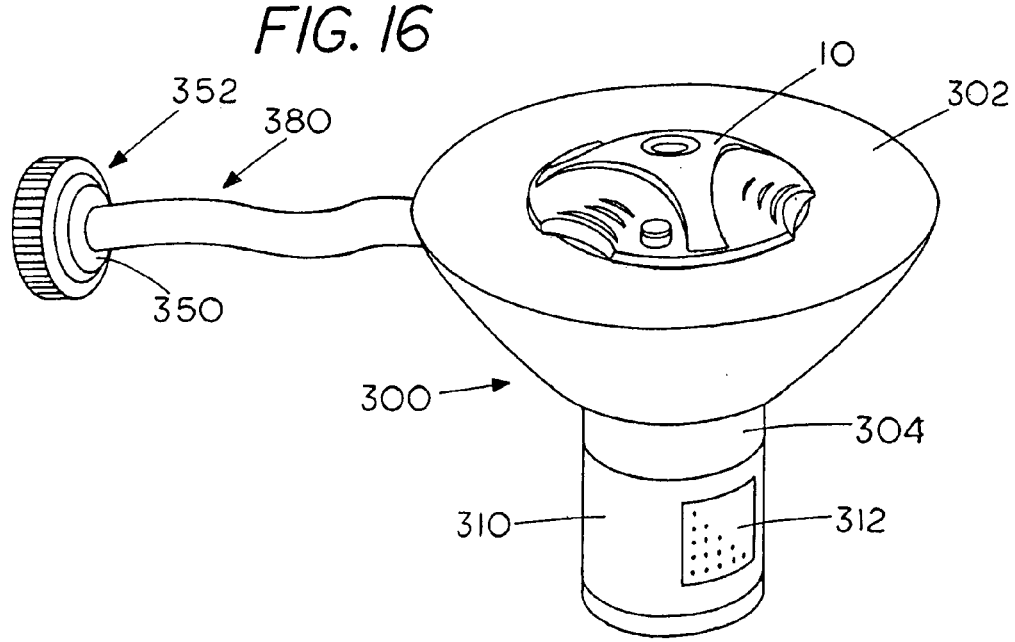
FIG. 16 shows the water purification system of FIG. 15 in operational use.

Referring now to FIGS. 15 and 16, yet another embodiment of the water treatment system of the present invention is shown. The system includes a water return conduit 350 held in position on a pool wall 210 by a water return inlet fitting 352. A flexible hose member 380 is secured at one end to the return conduit 350 and at the other end to a floatation support member 300 that includes a hollow floatation top portion 302 and a weighted hollow bottom portion 304. A converging central passage 306 from the floatation top portion 302 terminates at the hollow bottom portion 304, with the bottom opening controlled by a rotatable sleeve portion 310 with a perforated section 312. The hollow floatation top portion 302 includes an interior passage 382 joined at one point to the flexible hose member 380 and having outlet apertures 384 radially disposed around the central passage 306 and near the top thereof. The converging central passage 306 is sized to accept the water treatment device 10 with the legs 31 resting on a ledge 308 in the passage 306. With the device 10 positioned in the converging central passage 306 of the floatation support member 300, pool water from the inlet conduit 350 flows through the flexible tube member 380 and the joined interior passage 382 and out the apertures 384, and passes around and though the device 10, thereby contacting the water treatment material 83 contained therein. The water treatment material 83 preferably includes a metal ion yielding material, and most preferably includes silver chloride. The water flows through the converging central passage 306 and out the perforated section 312 of the rotatable sleeve portion 310. The converging central passage 306 is sized to accept a chemical puck 206, such as chlorine, positioned beneath the legs 31 of the device 10 and supported on the ledge 308 of the passage 306. The puck 206 introduces chlorine or bromine to water flowing through the passage 306 of the floatation support member 300.

Figure 17:
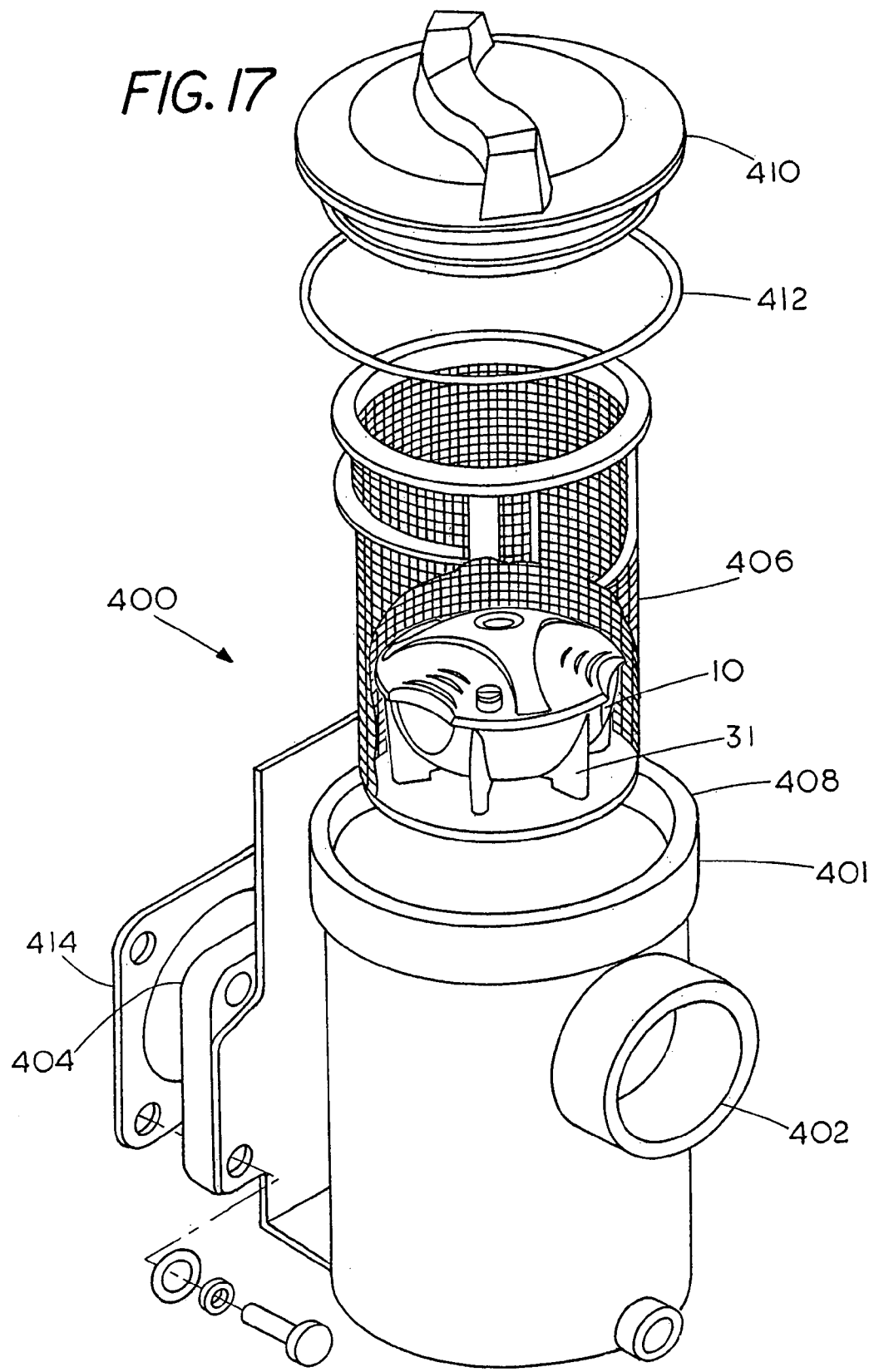
FIG. 17 shows an exploded view of another embodiment of a water purification system that includes a pump prefilter member with an internal debris-retaining basket supporting the water purification device.

Yet another embodiment of the water treatment system of the present invention is shown in FIG. 17. The treatment system includes a debris prefilter member 400 for the pump member 205. The prefilter member 400 includes a housing 401 with an inlet 402 and an outlet 404 with a debris-retaining mesh basket member 406 positioned within the housing 401 so as to collect debris from water received entering from the inlet 402. The housing 401 includes a basket member access opening 408 with a removable cover member 410 secured thereto. A gasket member 412 seals the cover member 410 to the access opening 408 to prevent water leakage, and another gasket member 414 is employed to seal the prefilter member outlet 404 to the pump inlet (not shown). The water treatment device 10 is positioned within the mesh basket member 406 with the support legs 31 resting on the bottom of the basket member 406, as shown in FIG. 17. As water is drawn into the prefilter member 400 and through the basket member 406, a portion contacts and flows though the water treatment device 10, as described above, thereby contacting the water treatment material 83 contained therein. The water treatment material 83 preferably includes a metal ion yielding material, and most preferably includes silver chloride. The water continues though the prefilter member 400 and on to the pump member 205.

Figure 18:
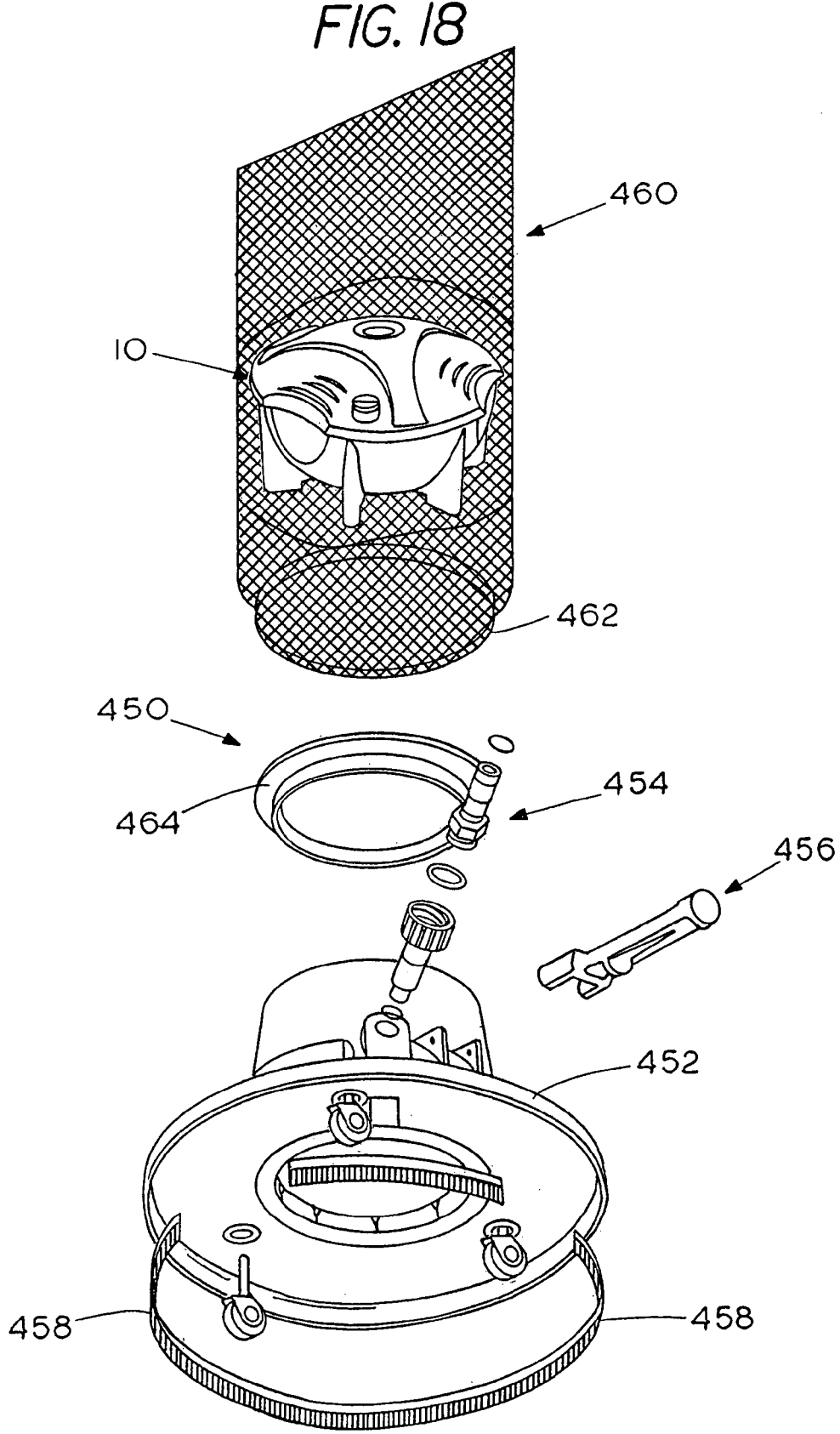
FIG. 18 shows an exploded view of another embodiment of a water purification system that includes a debris collection member with a debris-retaining mesh bag containing the water purification device.
Figure 19:
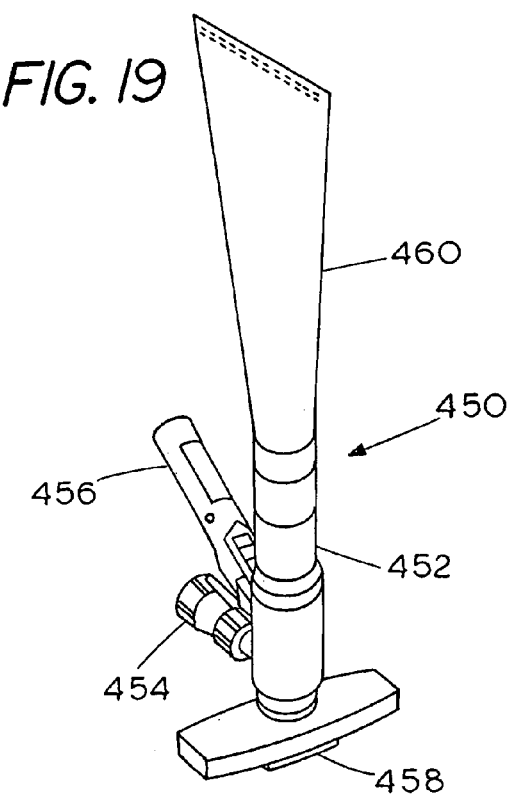
FIG. 19 shows the water purification system of FIG. 18 in operational use.

Referring now to FIGS. 18 and 19, yet another embodiment of the water treatment system of the present invention is shown. The system includes a fluid powered debris collection member 450 that includes a collection member housing 452 with an attached debris-collection mesh bag member 460 secured thereto. The housing portion 452 includes a hose attachment fitting 454 that connects to an external water source, such as a garden hose, and a handle attachment fitting 456 for use in directing the collection member 450 during use.

The housing portion 452 is hollow with a brush member 458 radially disposed about the bottom end thereof, and with the mesh bag member 460 secured to the housing top end by means of a retaining flange 464 and a drawstring 462 on the bag member 460. The collection member 450 operates by submersion in the pool 200 with the connected water source directed upwardly within the housing 452 an into the mesh bag member 460. Moving the debris collection member 450 over the bottom of the pool 200 by means of a handle member (not shown) secured to the handle attachment fitting 456, with the water hose directing water into the mesh bag member 460, causes debris to be carried into and collected by the mesh bas member 460. The water treatment device 10 is positioned within the mesh bag member 460, as shown in FIG. 18. As water is drawn into the collection member housing 452 and through the mesh bag member 460, a portion contacts and flows though the water treatment device 10, as described above, thereby contacting the water treatment material 83 contained therein. The water treatment material 83 preferably includes a metal ion yielding material, and most preferably includes silver chloride. The treated water thus remains within the pool 200.

Figure 20:
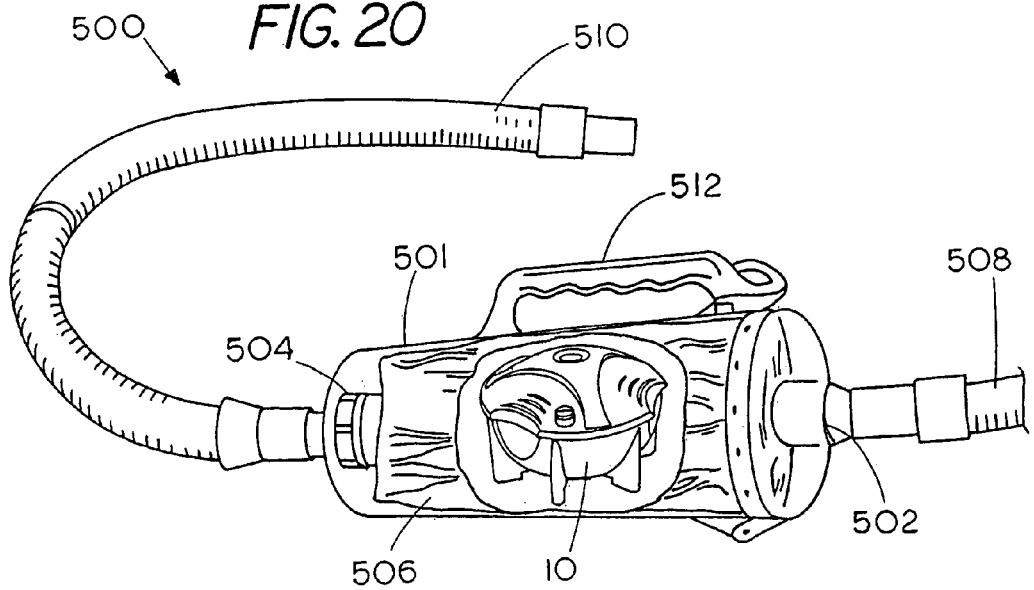
FIG. 20 shows a partial sectional view of another embodiment of a water purification system that includes another debris collection member with a debris-retaining mesh bag containing the water purification device.

Yet another embodiment of the water treatment system of the present invention is shown in FIG. 20. The treatment system includes a leaf trap member 500 for use in removing leaf debris from the pool 200. The leaf trap member 500 includes a housing member 501 with an intake 502 and an outlet 504 and contains a debris-collecting mesh bag member 506 positioned within the housing 501, so as to collect debris from water entering through the housing intake 502. To the intake 502 is connected an intake hose 508, that the user directs to suck up debris, and an outlet hose 510 that connects the leaf trap housing 501 to a suction source, such as the conduit system leading to the pump member 205, as shown in FIG. 8. Debris laden water flows into the intake hose 508 and debris collects in the mesh bag member 506 within the housing 501. The water treatment device 10 is positioned within the mesh bag member 506, as shown in FIG. 20. As water is drawn into the leaf trap member 500 and through the mesh bag member 506, a portion contacts and flows though the water treatment device 10, as described above, thereby contacting the water treatment material 83 contained therein. The water treatment material 83 preferably includes a metal ion yielding material, and most preferably includes silver chloride. The water continues though the leaf trap member 500 and through the water circulation system and on to the pump member 205.

Figure 21:
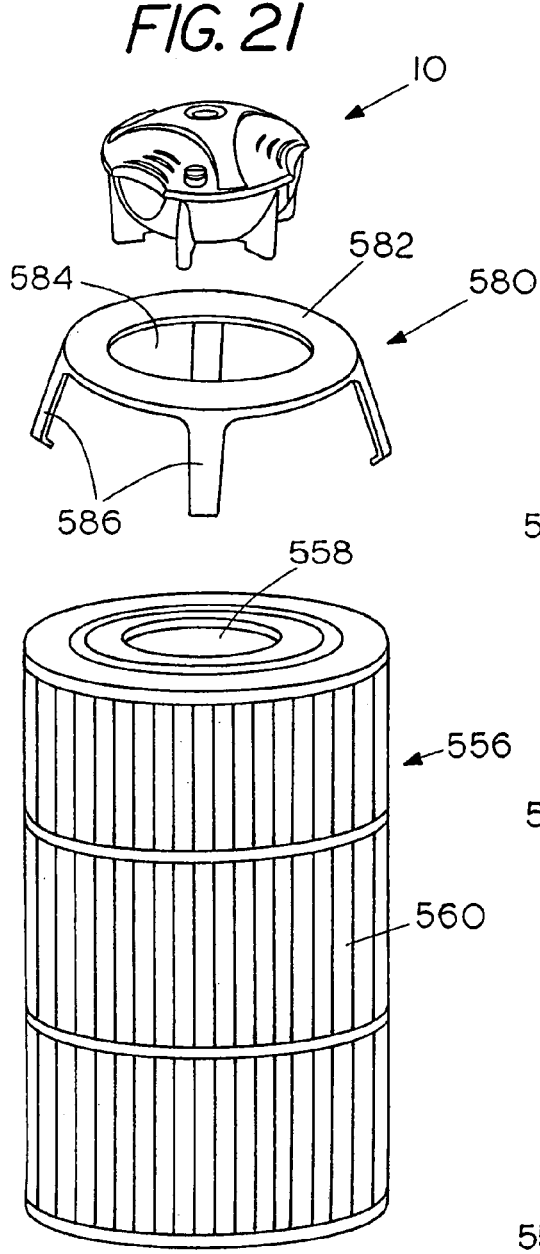
FIG. 21 shows an exploded view of another embodiment of a water purification system that includes a cartridge filter member with a support member holding the water purification device atop the filter member.
Figure 22:
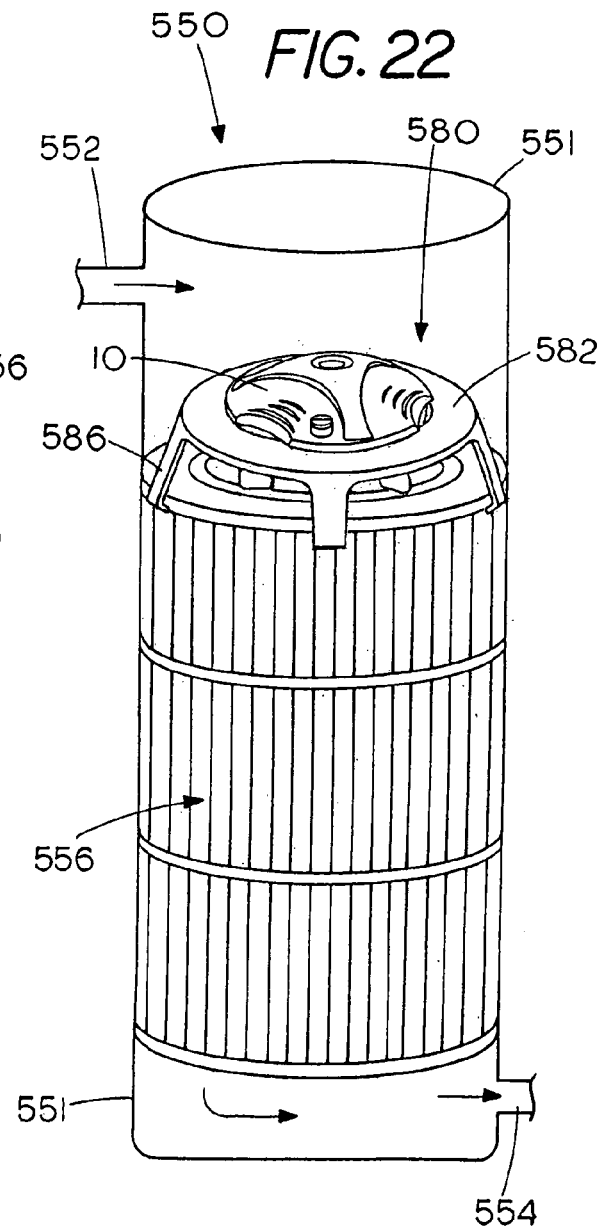
FIG. 22 shows the water purification system of FIG. 21 in operational use.

Referring now to FIGS. 21 and 22, yet another embodiment of the water treatment system of the present invention is shown. The system includes a cartridge filter assembly 550 that operates in the water circulation system for the pool 200. The cartridge filter assembly 550 is positioned downstream from the pump member 205, as illustrated in FIG. 8.

The cartridge filter assembly 550 includes a filter housing 551, having an inlet 552 and an outlet 554 with a cartridge filter member 556 supported within the housing 551. The cylindrical filter member 556 includes a central aperture 558, extending from top to bottom of the filter member 556, and a pleated filter element 560 vertically disposed around the cartridge 556. Water flows into the cartridge housing 551 via the housing inlet 552, through the cartridge filter member 556 and out of the housing 551, via the housing outlet 554. Atop the cartridge filter member 556 is positioned a support member device 580. The device 580 includes a support deck 582 with an aperture 584 therein. A number of leg clip members 586 are radially disposed around the support deck 582 for fastening the support member device 580 to one end of the cartridge filter member 556. The water treatment device 10 is positioned on the support member device 580 within the aperture 584 of the support deck 582. As water flows through the cartridge filter assembly 550, a portion contacts and flows though the water treatment device 10, as described above, thereby contacting the water treatment material 83 contained therein. The water treatment material 83 preferably includes a metal ion yielding material, and most preferably includes silver chloride. The treated water continues through the water circulation system and returns to the pool 200. FIG. 21 and FIG. 22 illustrate the water treatment support deck 582 above the filter the water treatment support could be positioned below the cartridge filter member 556.

While the invention has been shown in relation to a swimming pool the invention is usable with other contained water systems including spas, hot tubs and the like and the water treatment device is suitable for holding a range of various water treatment materials such as softeners, algaecides, bactericides.

We claim:

1. A water treatment system comprising:
a housing supporting a contained water volume therein; and
a free standing water treatment device having a water treatment material contained therein, said free standing water treatment device located within said housing completely below a water line of the contained water volume, said free standing water treatment device including a container for holding the water treatment material, said container having an opening for the ingress and egress of water therethrough.

2. The water treatment system of claim 1 wherein the free standing water treatment device is supported by said housing.

3. The water treatment system of claim 1 wherein the opening of said container comprises an inlet and an outlet for the ingress and egress of water therethrough.

4. The water treatment system of claim 1 wherein the free standing water treatment device includes a metal ion yielding water treatment material contained therein.

5. The water treatment system of claim 1 wherein the water treatment material contained therein is silver chloride.

6. The water treatment system of claim 1 wherein the housing supporting the contained water volume therein comprises a pool housing.

7. A water treatment system comprising:
a housing supporting a contained water volume therein; and
a free standing water treatment device having a water treatment material contained therein, said free standing water treatment device supported by said housing below a water line of the contained water volume, said free standing water treatment device including a container for holding the water treatment material, said container having a passage for directing a portion of water into contact with the water treatment material.

8. The water treatment system of claim 7 wherein the free standing water treatment device includes a metal ion yielding water treatment material contained therein.

9. The water treatment system of claim 7 wherein the water treatment material contained therein is silver chloride.

10. The water treatment system of claim 7 wherein the housing supporting the contained water volume therein comprises a pool housing.

11. The water treatment system of claim 7 wherein the passage of said container comprises an inlet and an outlet for directing a portion of water flowing thereto into contact with the water treatment material.

12. A method of purifying water of a contained water volume in a water treatment system comprising the steps of:
placing a free standing water treatment device comprising a container having a water treatment material contained therein in a housing completely below a water line of the contained water volume located within said housing for the purification of said contained water volume; and
allowing the water in the contained water volume access to the water treatment material.

13. The method of claim 12 wherein the step of placing the free standing water treatment device in a housing below a water line of the contained water volume located within said housing comprises placing the free standing water treatment device below a water line of a contained water volume in a pool housing.

14. The method of claim 12 wherein the step of placing the free standing water treatment device in a housing below a water line of the contained water volume located within said housing comprises placing the free standing water treatment device below a water line of a contained water volume in a spa or hot tub housing.

15. The method of claim 12 including the step of directing a portion of the contained water volume in contact with the water treatment material located in the container.

16. The method of claim 12 wherein the step of placing the free standing water treatment device in a housing below a water line of the contained water volume located within said housing comprises placing a free standing water treatment device below the water line of the contained water volume in said housing.

17. A water treatment system comprising:
a housing having a contained water volume therein; and
a free standing water treatment device having a water treatment material contained therein, said water treatment device having an exterior surface for supporting the water treatment device on the housing, said water treatment device located completely below a water line of the contained water volume, said water treatment device including an opening for directing a portion of contained water volume into contact with the water treatment material.

18. A method of purifying a contained fluid comprising the steps of:
forming a free standing container having a fluid treatment material located therein with said free standing container and said fluid treatment material having an insufficient buoyancy to float in said contained fluid;
placing the free standing container with the fluid treatment material in the contained fluid; and
allowing the free standing container with the fluid treatment material to submerge completely below a fluid line of the contained fluid for the purification of said contained fluid.

19. The method of claim 18 wherein the step of allowing the free standing container with the fluid treatment material to submerge completely below a fluid line of the contained fluid comprises allowing the free standing container with the fluid treatment material to submerge in the contained fluid to a bottom of the housing for the purification of said contained fluid volume.

* * * * *